United States Patent
Hundley

(10) Patent No.: US 6,860,911 B2
(45) Date of Patent: Mar. 1, 2005

(54) SYNFUEL COMPOSITION AND METHOD OF USING SAME

(76) Inventor: Joseph W. Hundley, 714 Circle Ct., Martinsville, VA (US) 24112

( * ) Notice: Subject to any disclaimer, the term of this patent is extended or adjusted under 35 U.S.C. 154(b) by 0 days.

(21) Appl. No.: 10/086,902

(22) Filed: Mar. 1, 2002

(65) Prior Publication Data

US 2003/0005622 A1 Jan. 9, 2003

Related U.S. Application Data

(63) Continuation-in-part of application No. 09/757,765, filed on Jan. 10, 2001, now Pat. No. 6,740,133.

(51) Int. Cl.$^7$ ................................................ C10L 5/00
(52) U.S. Cl. .............................. 44/620; 44/628; 44/603; 44/301; 44/280; 44/281
(58) Field of Search ........................... 44/280, 281, 301, 44/628, 603, 620

(56) References Cited

U.S. PATENT DOCUMENTS

| | | |
|---|---|---|
| 4,097,437 A | 6/1978 | Dhake |
| 5,330,795 A | 7/1994 | Batdorf |
| 5,437,722 A * | 8/1995 | Borenstein .................. 106/778 |
| 5,631,042 A | 5/1997 | Becker |
| 5,968,237 A * | 10/1999 | Sinnige ......................... 106/2 |

FOREIGN PATENT DOCUMENTS

| | | | |
|---|---|---|---|
| CN | 54048 | * | 2/1967 |
| CN | 1031363 | * | 3/1989 |
| CN | 1116650 | * | 2/1996 |
| CN | 1290729 | * | 4/2001 |

* cited by examiner

Primary Examiner—Cephia D. Toomer
(74) Attorney, Agent, or Firm—James W. Hiney

(57) ABSTRACT

The present invention re lates to a liquid synfuel additive composition which is used as an additive to coal fines to enhance the complete combustion of the coal after turning it into a synthetic fuel. The composition is a chemical change agent in that it converts the coal/composition mix into a different material which, when burned, results in lower noxious emissions. The composition includes a wax, a base for ph adjustment and water.

19 Claims, 6 Drawing Sheets

SYNFUEL COMPOSITION AND METHOD OF USING SAME

BACKGROUND OF THE INVENTION

The present invention relates to a liquid synfuel additive composition for application to materials such as coal for facilitating more complete and efficient combustion thereof. This application is a Continuation-In-Part of Ser. No. 09/757,765, filed Jan. 10, 2001, now U.S. Pat. No. 6,740,133 under the same title, "Synfuel Composition and the Method of Using Same" by the same inventor, J. Hundley.

This invention centers around a substance to convert raw coal fines into a synthetic fuel product. This substance, classified as a chemical change agent, contains functional groups, which are chemically active, and combine with coal to bring about a compositional change.

PRIOR ART

There is no existing prior art so far as the inventors hereof are aware. There have been fatty acids used in making wax emulsions for the purpose of sealing them against liquid water.

Paraffinic compounds are known to be water repellant and thus paraffin is typically used as a compound of wood preservative agents. For Example, U.S. Pat. No. 4,389,446 discloses a composition useful as a wood preservative agent which includes an organic solvent, solid paraffin as a water repellant agent and a biocide.

There is a great need for additives to combustibles these days which tend to act as chemical change agents to facilitate more complete combustion. Accordingly, there is an ongoing need for such chemical change agents to facilitate more complete combustion of coal.

It is an object of this invention to provide a chemical change agent to facilitate the complete combustion of coal, and It is another object of this invention to provide a synfuel additive which is environmentally acceptable and inexpensive, and These and other objects of this invention will become more apparent when reference is had to the accompanying specification.

SUMMARY OF THE INVENTION

The present invention relates to an aqueous composition to be used as a synfuel additive for combustible materials, especially coal.

The product contemplated by this invention is a latex emulsion comprising a paraffin wax or wax, a polyvinyl alcohol and water. The percentage of each ingredient is as follows:

| | |
|---|---|
| Paraffin wax or wax | 22.5% |
| Polyvinyl alcohol | 3.5% |
| Water | 74.0% |

Other additives can be used to improve properties including varying percentages of polyvinyl acetate. A blend of 90% of the latex emulsion, specified above, with 10% polyvinyl acetate produced good burning results. Likewise, the latex emulsion by itself proved to be a satisfactory synfuel additive. The use of the polyvinyl alcohol, makes the emulsion.

The use of the polyvinyl agent produces a chemical change agent which turns the composition into a synfuel. The invention contemplates adding polyvinyl acetate to the composition to enhance it's combustibility. It is contemplated that 10% or more may be added to the composition. The range can be from 0 to 20%.

It is also contemplated to add a pigment composition to make the chemical change agent black so as to blend with the coal. The use of carbon black may interfere with the strength of the film. The use of $TiO_2$ or $CaCO_2$ adds strength to the film. The use of these white pigments makes it easy to identify the coal that has been treated. There is an added benefit to add calcium-containing material like Calcium Oxide or Calcium Carbonate, as these compounds, when burned with the fuel, will react with Sulfur Dioxide to form Calcium Sulfate.

The exact percentages of the ingredients apparently can vary as follows:

| | |
|---|---|
| Paraffin wax or other wax | 0% to 55% |
| Polyvinyl alcohol | 0% to 50% |

Further testing is required to determine if the polyvinyl alcohol will work by itself. The Paraffin wax will not qualify as a synthetic material unless it is a synthetic wax.

The combination of polyvinyl alcohol and wax is synthetic since the polyvinyl alcohol is synthetic and is required to emulsify the wax.

The best product will have a solids content of from 25% to 50% with a 2% to 10% of the solids coming from polyvinyl alcohol and the remainder coming from the wax. The polyvinyl acetate may be added as needed.

The action of the moisture barrier and vapor barrier aspects of the composition are thought to be important to the action of the synfuel.

DETAILED DESCRIPTION OF THE PREFERRED EMBODIMENT

The compositions of the invention generally comprise at least one hydrocarbon was dispersed in an aqueous emulsion, which can form a film on particles of coal. The emulsions used in the composition of the present invention are preferably made using polyvinyl alcohol as the emulsifying agent. Thus, in it broadest form, the present invention relates to an aqueous composition comprising a hydrocarbon wax, a polyvinyl alcohol emulsifying agent, and the balance of water.

The aqueous composition of the present invention is designed for use as a coating for application to materials when burned. The purpose of using the film of the present invention is aide the combustion of the material to which it is applied.

Typical materials to which the composition of the present invention may be applied include materials such as coal, both bituminous and sub bituminous as well as lignite, wood and rubber.

The aqueous film composition of the present invention may be applied to a number of different materials. Both whole coal as well as coal "tailings" or fines can be coated with the instant film to facilitate combustion of the resulting material as a synfuel.

Representative non-limiting examples of the hydrocarbon waxes of the present invention include paraffin wax, slack wax, microcrystalline wax, olefin waxes and other, conventional, know hydrocarbon waxes. More preferred hydrocarbon waxes are those made up of relatively high molecular weight components since such waxes tend to exhibit better film-forming properties. Included in the hydrocarbon waxes are fatty acids like Oleic, Steaeric, Linoleic, Linolenic, Palmitic, Myristic, Lauric, Capric and other fatty acids.

The aqueous composition of the present invention comprises 5.0% to 45.0% by weight, based on the total weight of the composition, of the hydrocarbon wax. More preferably, the aqueous composition of the present invention comprises 10% to 35% by weight of the hydrocarbon wax and, as a preferred ratio, the aqueous coating composition of the invention comprises 15 to 25% by weight of the hydrocarbon wax. Naturally, the mixtures of one or more hydrocarbon waxes may also be employed in the aqueous composition.

In addition to water and the hydrocarbon wax, the aqueous coating composition of the present invention comprises an emulsifying agent such as that the aqueous composition forms an emulsion in water, which can be applied to a coal material. The emulsifying agents useful in the present invention are the polyvinyl alcohols. Any form of polyvinyl alcohol may be employed in the present invention irrespective of its degree of hydrolysis and/or degree of polymerization. However, the degree of polymerization and degree of hydrolysis of the polyvinyl alcohol may have an impact on the strength of the film, which is formed from the aqueous coating composition of the present invention. The specific polyvinyl alcohol which is selected to be used in the present invention will be that which demonstrates the best properties in terms of combustion.

The polyvinyl alcohol emulsifying agent is employed in an amount of 1.0% to 10.0% by weight, based on the total weight of the aqueous coating composition. More preferably, the polyvinyl emulsifier comprises 2 to 5% by weight of the composition. Naturally, mixtures or two or more polyvinyl alcohols having differing degrees of hydrolysis and/or polymerization may be employed in the aqueous synfuel composition of the present invention.

The composition of the present invention may also optionally include up to 1.0% by weight of a biocide, based on the total weight of the composition. Such biocides are known in the art and include pesticides and other materials designed to prevent the growth of organisms in the aqueous coating composition during storage and use. The biocide will typically be employed in an amount sufficient to prevent the growth of living organisms in the aqueous coating composition during storage. Such amounts do not usually exceed 1.0% by weight and, more preferably, only up to 0.5% by weight of the biocide is employed. Most preferably, the biocide comprises up to 0.105 by weight of the aqueous synfuel composition.

In addition, the synfuel composition of the invention may optionally contain one or more filler materials. Any conventional filler material may be used for this purpose such as oxygen containing compounds like sugar, acedic acid and salts of acedic acid and other oxygen containing compounds may be added to improve combustion. Calcium Oxide. Calcium Carbonate and Lime may be added to the emulsion in order to add solids as well as to reduce Sulfur Dioxide emissions. Calcium compounds may be 0% to 61% of the formula.

The synfuel composition of the invention may be made by mixing the ingredients using a conventional mixing apparatus. If a prolonged storage period is anticipated, it is preferred to run the composition through a homogenizer before putting it in a storage container. The composition is storage stable for prolonged periods of six months or more. The addition of a biocide prevents the growth of undesirable organisms.

The synfuel: Composition of the present invention can be applied in any conventional manner. For example, the composition my be applied using spray guns immersion, etc.

The instant invention also meets all the Federal Air Quality Regulations in 40 C. F. R. This is very significant since conventional, commercially available synfuels, do not, in a lot of cases, meet the Federal Standards, as they contain hazardous components and/or volatile organic compounds. Hence, the instant invention is environmentally friendly. The addition of polyvinyl acetate to the basic composition enhances it burning ability when used with coal.

In addition to being non-toxic and containing no volatile organic compounds, the present invention does not leave any residue necessitating clean up after combustion. In fact, it facilitates a more complete combustion of the coal and hardly leaves any residue. The addition of Calcium compounds also will reduce Sulfur Dioxide emissions.

Figure 1:
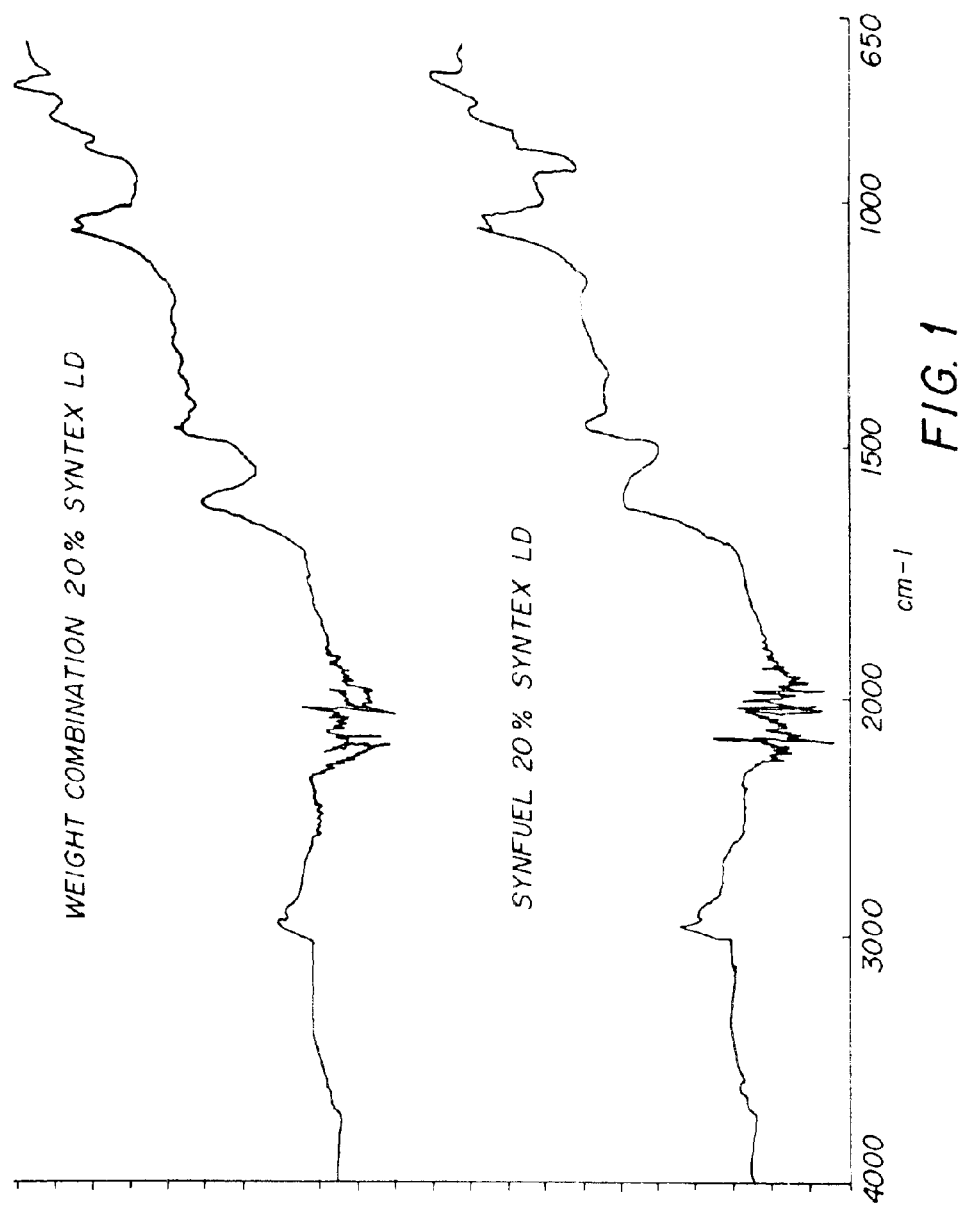
FIG. 1 is a graph of the chemical changes in weight combination contrasted with the synfuel 20° Syntex LD.

Tests on the new synfuel additive known as Syntex with High Volume Coal Fines

Basically the new substance which forms the core of this invention converts raw coal fines into a synthetic fuel product. The substance, classified as a chemical change agent, contains functional groups, which are chemically active, and combine with coal to bring about a compositional change. The object of the tests was to determine whether or not the chemical change agent provided would bring about sufficient chemical reactions when combined with the feedstock coal fines to produce a synthetic fuel product.

Raw coal fines are combined with the chemical change agent. The two substances were then mixed to insure maximum contact to allow a chemical reaction to occur. The mixture was then compressed to form the synthetic fuel product. These distinctive conditions were simulated during the test to effectively recreate those found within a synthetic fuel plant.

The chemical combinations of the mixture can produce a synthetic fuel source with a decidedly different chemical composition than that of a physical mixture of the coal and agent. The industry standard is a minimum of 15% chemical change.

The two mixture ingredients were separately analyzed as was the mixture product using Fourier Transform Infrared spectroscopy in order to confirm or disprove an actual chemical change within the synthetic fuel product.

Fourier Transform Infrared spectroscopy allows one to observe the chemical structures of materials. In this case, the analysis was used to search for a difference in spectra among the samples tested. Differences in the spectra of the material indicates a chemical change among the materials. These spectral changes can range from differences in intensify at equivalent frequencies to different peak structures at equivalent frequencies.

The analysis spectra displayed an obvious and measurable chemical change between the synthetic fuel product and the raw coal fines. These measurable spectra differences indicate that the synthetic fuel is a product of intricate chemical changes and not just a physical combination of coal and the chemical change agent.

Two chemical change agents were used in the test. The first was Syntex-LD and the second was Syntex-MD. The raw coal sample was meticulously mixed and riffed to garner a smaller sample for analysis. The raw coal was reduced in particle size using a mortar and pestle through a sixty mesh screen. The grinding process was performed at a minimal pace and care was taken to clean all instruments in order to avoid a cross-contamination of samples. The same process was used on the synthetic fuel mixture.

During the test, the raw coal, chemical change agent and synthetic fuel spectra were obtained with a Perkin Elmer Spectrum One FTIR spectrometer. Thirty-two scans of each sample comprised an average to obtain final spectra listed below.

Fourier Transform Infrared Spectroscopy is useful for determining chemical bonds within substances. Alterations in the spectra of raw coal and the synthetic fuel indicate a change in the chemical bonds at these wavelengths. Thus, a greater or lesser number of certain bonds at a wavelength will lead to a change in the spectra involved. The bonds most often seen pertaining to raw coal and the synthetic fuel product are:

1. Carbon-carbon bonds. Basic organic molecules are constructed of carbon—carbon bonds. These bonds may be either aromatic or aliphatic. Aromatic carbon atoms are joined in a ring structure and involve double bonds among the carbon bonds. The infrared area of interest for these bonds is around 1500–1650 wave numbers. It should be noted that most of the bond stretching occurs in the range of 1600–1650 wave numbers. Any change in intensity of two spectra or peak structure in this area would indicate a definite chemical difference between two substances. Thus, if the synthetic fuel product displays a greater or lesser intensity in this range than the raw coal a chemical change has occurred. Peak structure differences in this range would indicate a chemical change.
2. Carbon-Oxygen bonds. These adsorb infrared light from 1050–1250 wave numbers. The actual range of adsorption will vary depending upon whether or not it is attached to an aliphatic or aromatic carbon base. Any change in intensity of two spectra or peak spectra in this area would Indicate a chemical difference between two substances.
3. Carbon-Hydrogen bonds. These bonds are prominent in aliphatic carbon structures with peak adsorption of infrared light at around 1360 and 1430–1470 wave numbers. In aromatic carbons the carbon-hydrogen bonds adsorb infrared light from about 650–925 wave numbers.

Fourier Transform Infrared Spectroscopy Results

Figure 2:
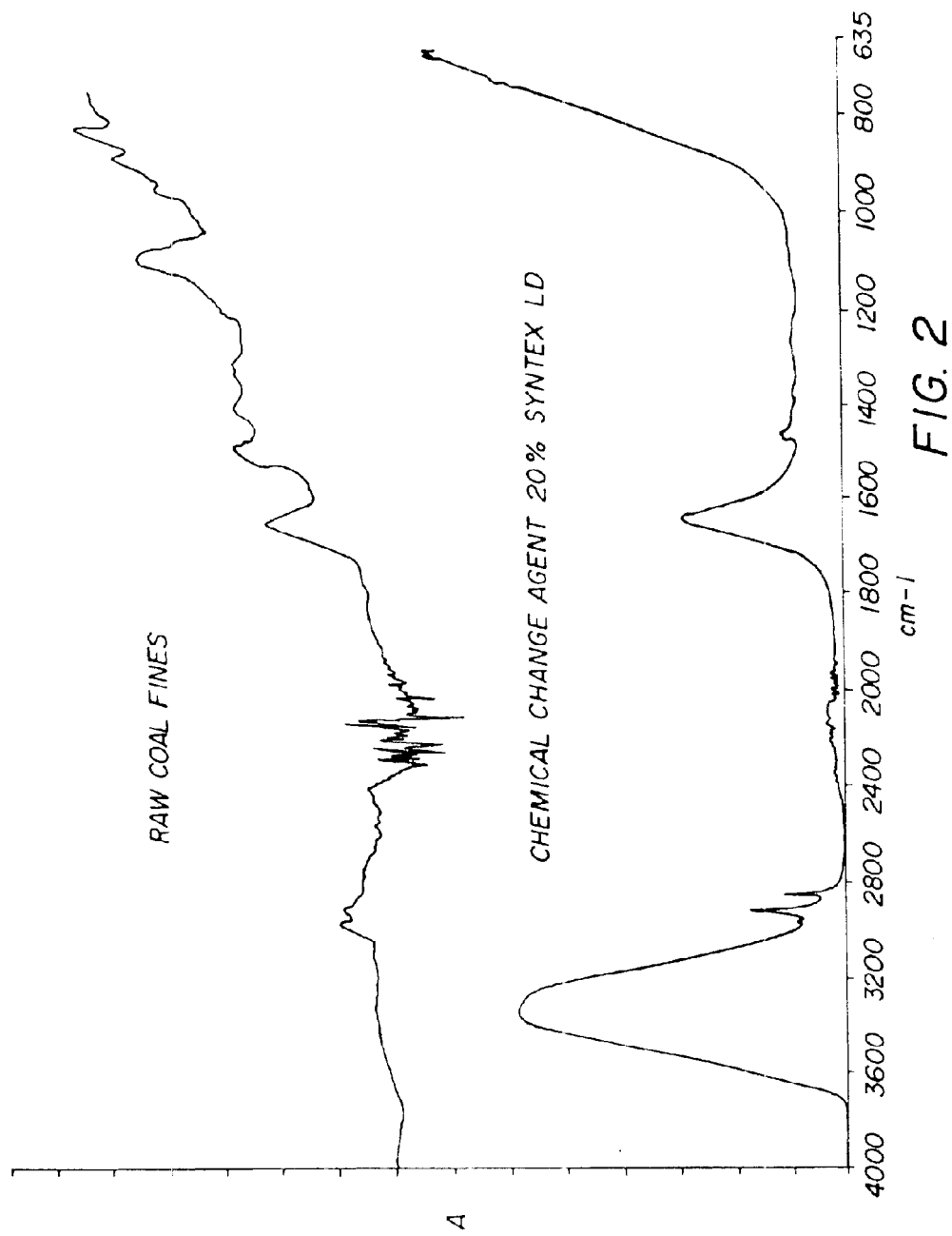
FIG. 2 is a graph of the chemical changes in weight of the raw coal fines and the chemical change agent 0.20% Syntex LD.

There are comparisons of raw coal fines, synthetic fuel product and the chemical change agent on the graphs shown as FIGS. 1 and 2. The synthetic fuel contained 0.20% wt. of the agent and 99.80% of raw coal. In order to construct a weight combination spectra the agent spectra was multiplied by 0.0020 and the raw coal spectra was multiplied by 0.9980. These two spectra were then added together to form the Weight Combination spectra. This addition accounts for the percentage of agent and raw coal within the sample itself.

Thus, a difference in the weight combination spectra and the spectra of the synthetic fuel product would indicate a difference in chemical bonds associated with each spectra. Therefore, a change in the weight combination spectra as compared to the synthetic fuel spectra would serve as evidence that an actual chemical change has occurred in the formation of the synthetic fuel.

In this particular analyzation, the synthetic fuel spectra is significantly and measurable different from the spectra of the weight combination spectra using the prescribed agent. The calculated mathematical difference between the weight combination spectra and that of the synfuel spectra totaled a net 23% change. This difference confirms the claim the the synthetic fuel product is the production of chemical changes and not merely a physical mixture.

FIGS. 1 and 2 show the differences between the raw coal, the agent and the two mixtures, Syntex-LD and Syntex-MD. The LD and MD stand for low density and medium density, terms used to describe coal.

The results showed spectral changes and include.

1. An increase in absorbance of the doublet peak at around 1050 wave numbers. This area is associated with carbon-oxygen bonds. The increase of the synthetic fuel's absorbance in this area indicates a differing type of bonding than that of a physical mixture.
2. An increase in absorbance at 1600 wave numbers which is associated with aromatic carbon—carbon bonds. This indicates that the synthetic product has more aromatic carbon—carbon bonds than a physical mixture would have.
3. An increase in absorbance at 2900 wave numbers. This is an area of absorbance associated with carbon-hydrogen bonds. The synthetic fuel product displays a larger number of these bonds than those that would be found in a physical mixture.
4. An increase in absorbance at 1440 wave numbers. This is an area of absorbance associated with carbon-hydrogen bonds as well. The synthetic fuel product displays a larger number of these bonds than those that would be found in a physical mixture.

In conclusion the analysis proved the chemical changes occur when the chemical change agent of this invention, either Syntex-LD or Syntex-MD is combined with raw coal fines to create a synthetic fuel product.

Tests on the chemical change Agent know as Syntex with Low Volume Coal Fines

Figure 3:
FIG. 3 is a graph of the chemical change in weight of the feedstock coal fines and the chemical change agent 0.20% Syntex LD.
Figure 4:
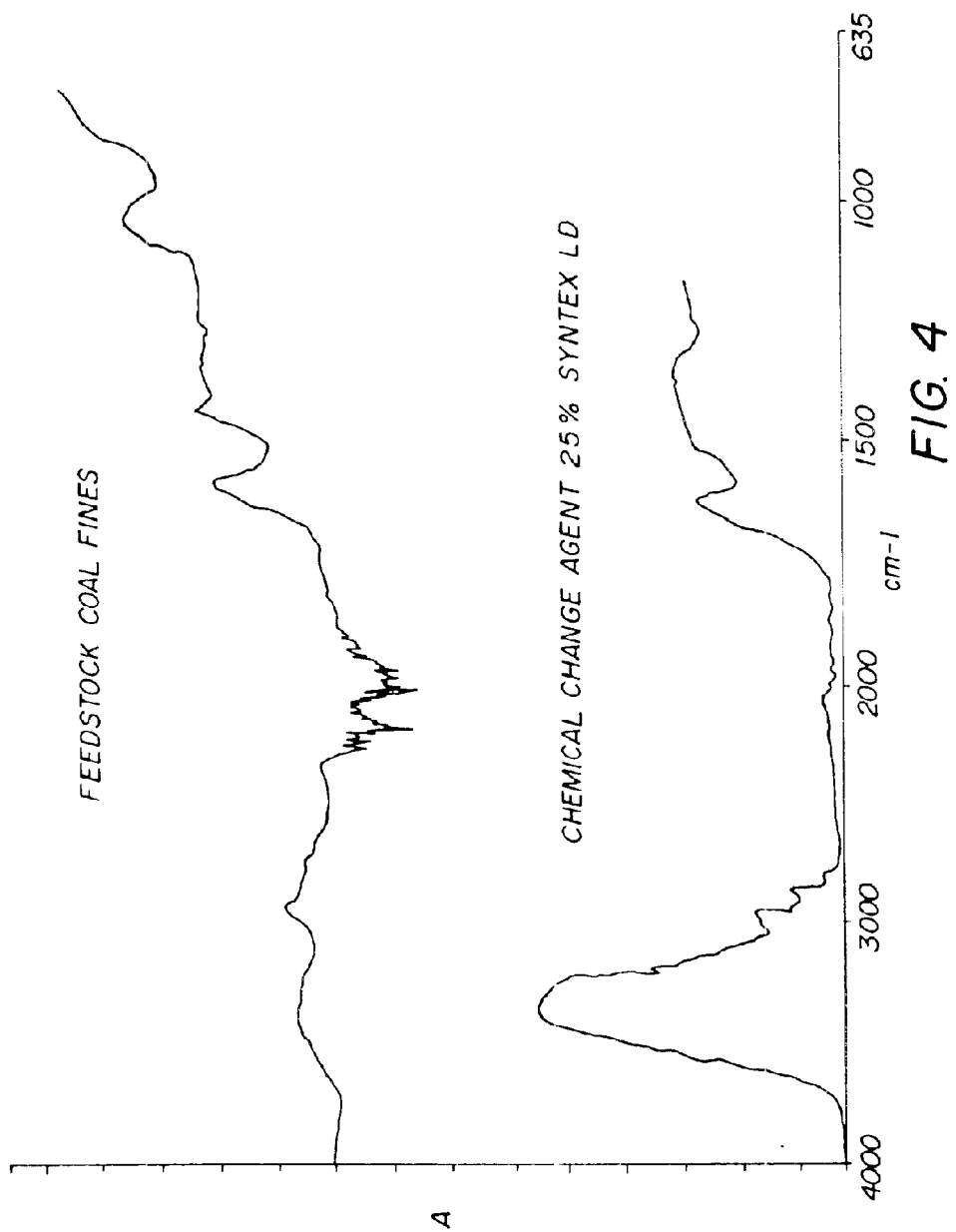
FIG. 4 is a graph of the chemical change in weight of the synfuel 0.25% Syntex LD and the weight combination 25% Syntex LD.

The same tests were run and the results of the Fourier Transform Infrared Spectroscopy are as follows:

There are comparisons of the raw coal fines, synthetic fuel product and the agent on the graphs shown as FIGS. 3 and 4. The synthetic fuel contained a 0.25% wt of agent and 99.75% wt of raw coal. In order to contstruct a weight combination spectra the agent spectra was multiplied by 0.0025 and the raw coal spectra was multiplied by 0.9975. These two spectra were then added together to form the Weight Combination spectra. This addition accounts for the percentage of agent and raw coal within the sample itself.

Thus, a difference in the weight combination spectra and spectra associated with the synthetic fuel product would indicate a difference in chemical bonds associated with each spectra. In this analyzation, the synthetic fuel spectra is significantly and measurable different from the spectra of the weight combination spectra using the prescribed agent. The calculated mathematical difference between the weight combination spectra and that of the synfuel spectra total a net 19% change. This difference confirms the claim that the synthetic fuel product is the production of chemical changes and not a mere physical mixture.

The spectral changes that point to the chemical reactions and change include:
1. An increase in absorbance of the doublet peak at around 1050 wave numbers. This area is associated with carbon-oxygen bonds.
2. An increase in absorbance at 1600 wave numbers. This area is associated with aromatic carbon—carbon bonds.
3. An increase in absorbance at 2900 wave numbers which is associated with carbon-hydrogen bonds. The number of bonds is larger than in a mere mixture.
4. An increase in absorbance at 1440 wave numbers which is associated with carbon-hydrogen bonds as well.

The conclusion is that again with low density coal, several chemical changes occurred when the agent was combined with the coal. The mixture is another entity entirely when compared with the raw coal and agent in physical combination.

The samples are as follows:

| | | |
|---|---|---|
| Syntex LD | 0.20% | 21% |
| Syntex LD | 0.20% | 27% |
| Syntex LD | 0.20% | 15% |
| Syntex LD | 0.20% | 13% |

The most successful formula contains paraffin wax, paraffin oil, hydrocarbon wax in the form of stearic acid, titanium dioxide, water and aqua ammonia. The fatty acid reacted with ammonia also acts as an emulsifying agent. The reaction is as follows ammonium stearate is used in this example but other fatty acids and bases may be used.

Stearic Acid + Ammonium Hydroxide...Ammonium Stearate + Water $C_{17}H_{35}COOH + NH_4OH...C_{17}H_{35}COONH_4 + H_2O$ Ammonium Stearate + Calcium Hydroxide (from coal)...

$2(C_{17}H_{35}COONH_4 + CaOH...$

Calcium Stearate + Ammonium Hydroxide $Ca(C_{18}H_{35}O_2) + 2NH_4OH$

This reaction results in changing the coal in a number of measurable ways:
1. First, it shifts the Thermo-gravimetric analysis (TGA) to the right. The TGA test measures the temperature and rate at which pyrolysis products evolve A change in TGA of 7% or more indicates significant chemical change has occurred. Tests in a laboratory report a 28% change in peak area on a TGA test. Further tests also report a high TGA with 14.6% chance in peak area. This is an extremely high chemical change agent that they have tested at 0.2% application rate.
2. Second, ammonia released from this reaction reacts with aldehydes to produce amines.
3. Third, excess ammonia not reacted with aldehydes and other compounds, is available to be burned with the coal. In the combustion of coal, it has been found that ammonia will reduce $No_x$ formation. It has also been found that if $NO_x$ are reduced, then sulfuric acid formation is reduced.

Fourier Transform Infrared Spectroscopy allows for measurement of chemical change. Tests run by three independent laboratories confirm significant chemical change even at 0.2% application rate. Lab tests show a 35% change on test samples. In refining and improving of the fatty acid product, the inventor has understood the role of excess ions of potassium, sodium and even ammonia on the reactions that take place between the coal and chemical change agent. Excess ions mentioned above act as water softeners and, thus, slow down or stop the exchange reaction. This is the reason one gets lower readings on FTIR tests. One test uses potassium bromide to mix with the coal and chemical change agent. The tests to date have been made with the following formula:

| | |
|---|---|
| Slack wax (Paraffin wax with 11% Paraffin oil) | 46.3% |
| Other wax (Stearic acid) | 2.0% |
| Ammonia (for ph adjustment) AR | 0.2% |
| Titanium Dioxide | 4.5% |
| Water | 47.0% |

Titanium is added to control viscosity and to help the product to be seen after it is applied to the coal. The following range of combinations are claimed.

| | |
|---|---|
| Wax (Paraffin wax, slack wax, Alfa Olefins, Fatty Acids) | ½% to 70% |
| Base for ph adjustment (Ammonium hydroxide, Potassium hydroxide Sodium hydroxide) as needed. | 0.2% |
| Water | 30%–99% |

The invention of this application centers around a substance to convert raw coal fines into a synthetic fuel product. This substance, classified as a chemical change agent, contains functional groups which are chemically active and combine with coal to bring about a compositional change.

The process involves combining raw coal fines with chemical change agents (CCAs). The two substances, the CCA and the raw coal, are then mixed to insure maximum contact to allow a chemical reaction to occur. The CCA and the raw coal mixture is then compressed to form the finished synthetic fuel product. These distinctive conditions were simulated by testing to effectively recreate those found within a synthetic fuel plant.

The chemical combinations of the CCA and raw coal fines can produce a synthetic fuel source with a decidedly different chemical composition than that of a physical mixture of the constituent coal and CCA.

Fourier Transform Infrared spectroscopy was used to analyze to confirm An actual chemical change within the synthetic fuel product. The spectroscopy process allows one to observe the chemical structures of materials. In this case, the analysis was used to search for a difference in spectra among the CCA raw coal, and synthetic fuel samples. Differences in the spectra of the materials would indicate a chemical change among the materials. These spectral changes could range from differences in intensity at equivalent frequencies to different peak structures at equivalent frequencies.

The analysis spectra displayed an obvious and measureable chemical change between the synthetic fuel product and the raw coal fines. These measureable spectra differences indicate that the synthetic fuel is a product of intricate chemical changes, and not just a physical combination of raw coal and CCA.

The CCA used in the test was white in color at room temperature. It is more viscous than water and it was a chemically reactive organic substance. The synthetic fuel product was created in accordance with conditions similar to those found within a synthetic fuel plant. The dosage was 0.20% by weight. This was accomplished by applying the appropriate amount of CCA to a defined amount of feedstock coal fines.

The raw coal sample was mixed and riffled to garner a small example for analysis representative of a field sample. The raw coal was then reduced in size using a mortar and pestle to pass through a sixty mesh screen. The same process was performed on the synthetic fuel product.

Fourier Transform Infrared Spectroscopy is a test that outlines the certain types of chemical bonds/structures that exist with a certain substance. It works on the premise that differing chemical structures/bonds will adsorb different levels of infrared energy or frequencies. In this way, spectral differences between the absorption of raw coal and that of the synthetic fuel product would indicate differences in amounts kinds of chemical bonds within a structure. These differences would indicate a definite deviation in the chemical composition of the synthetic fuel product from that of the raw coal fines.

The raw coal, synthetic fuel and CCA spectra were obtained with a Perkin Elmer Spectrum One FTIR spectrometer from 0.1 grams of each sample placed in a sample Holder. Thirty two scans of each sample comprised an average to obtain final spectra Described herein. The instrument was set at 4 wave numbers and covered a frequency Range of from 635 to 4000 wave numbers. The greater or lesser number of certain Bonds at a wavelength will lead to a change in the spectra involved. Typical of the Bonds pertaining to raw coal and synthetic fuel products are as follows:

Carbon—Carbon Bonds

Basic organic molecules are constructed of carbon—carbon bonds. These bonds may be either aromatic or aliphatic. Aromatic carbon atoms are joined in a ring structure and involve double bonds among the carbon bonds. The infrared range of interest for these bonds is around 1500–1650 wave numbers. It should be noted that most of the double bond stretching occurs in the range of 1600–1650 wave numbers any change in the intensity of two spectra or peak spectra in this area would indicate a definite chemical difference between the two substances. Thus, if the synthetic fuel product displays a greater or lesser intensity in this range than the raw coal a chemical change has occurred. Also, peak structure differences in this range would indicate a chemical chance.

Carbon-Oxygen Bonds

Carbon-Oxygen bonds adsorb infrared light from 1050–1250 wave numbers. The actual range of absorption will vary depending upon whether or not it is attached to an aliphatic or aromatic carbon base.

Any change in intensity of two spectra or peak structure in this area indicates a definite chemical difference between the two substances. Thus if the synthetic fuel product displays a greater or lesser intensity in this range than the raw coal a chemical change has occurred. Also, peak structure differences in this range would indicate a chemical change.

Carbon-Hydrogen Bonds

These bonds are prominent in aliphatic carbon structures with peak absorption infrared light at around 1360 and 1430–1470 wave numbers. In aromatic carbons, the carbon-hydrogen bonds absorb infrared light from about 650–925 wave numbers.

Any change in intensity of two spectra or peak structure in this area would indicate a definite chemical difference between two substances. Thus, if the synthetic fuel product displays a greater or lesser intensity in this range than the raw coal a chemical change has occurred. Also, peak structure differences in this range would indicate a chemical change.

Figure 5:
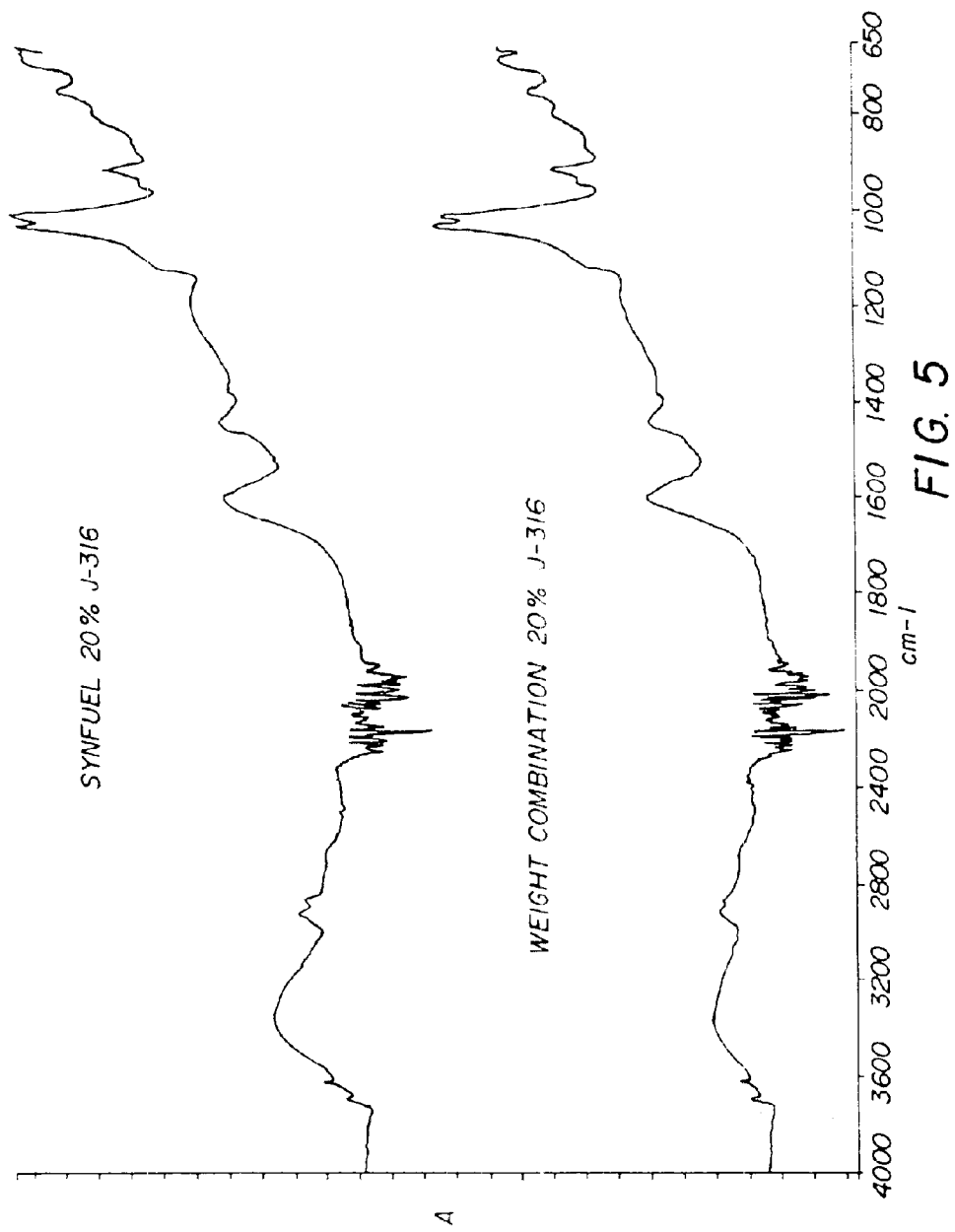
FIG. 5 is a graph showing the comparison between CCA spectra and the Synthetic fuel product.
Figure 6:
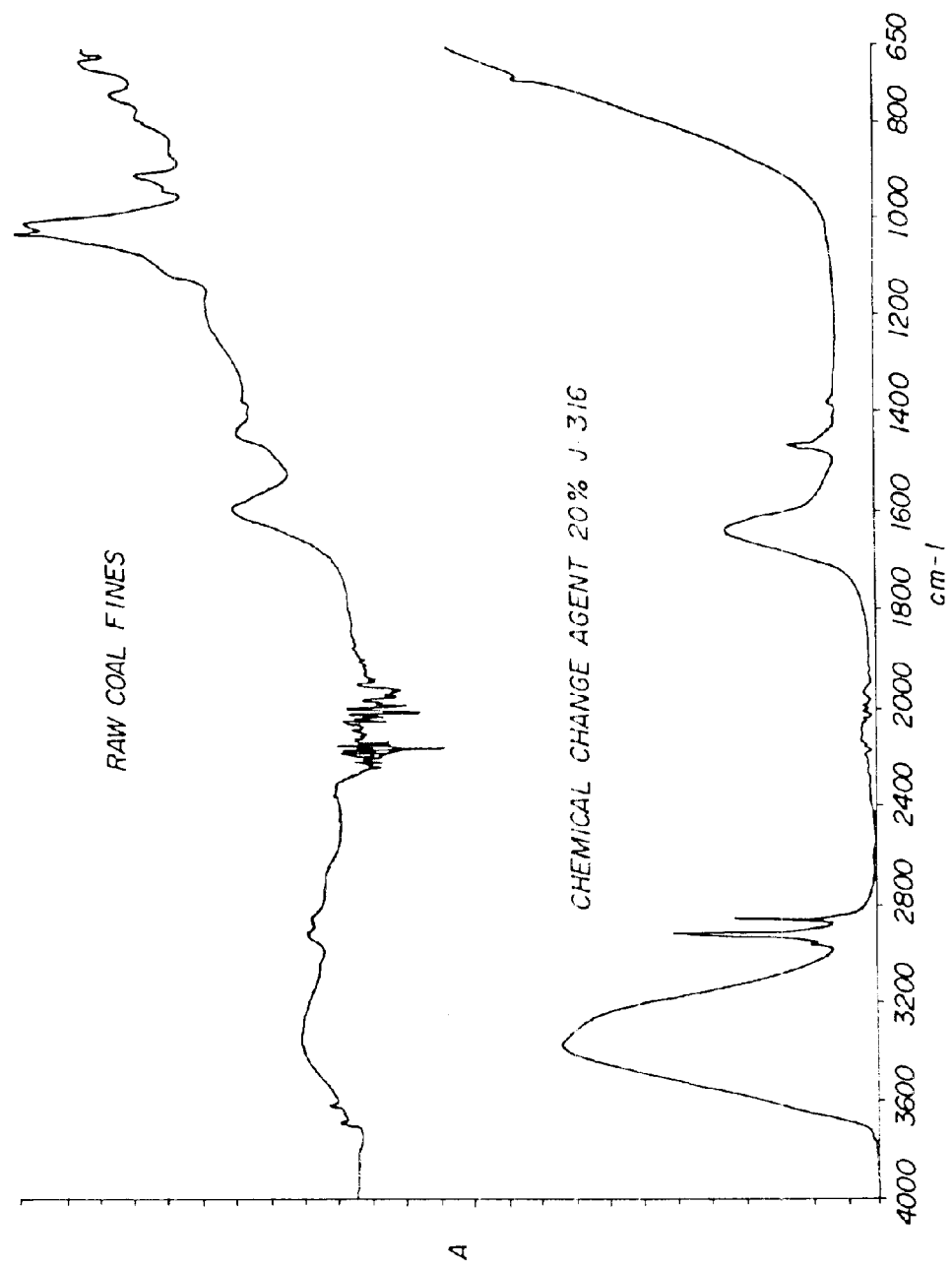
FIG. 6 is a graph showing the comparison between the CCA spectra and the Raw coal fines.

The results of the spectroscopy analysis is shown in FIGS. 5 and 6. There, the synthetic fuel contained 20% wt. of CCA and 99.80% wt. of raw coal. In order to contstruct a weight combination spectra the CCA spectra was multiplied by 0.0020 and The raw coal spectra was multiplied by 0.9980. These two spectra were then added together to form the Weight Combination spectra. This addition accounts for the percentage of CCA and raw coal within the sample itself.

Thus, a difference in the weight combination spectra and the spectra of the synthetic fuel product indicates a difference in chemical bonds associated with each spectra. Therefore, a change in the weight combination spectra as compared to the synthetic fuel spectra would serve as evidence that an actual chemical change has occurred in the formation of the synthetic fuel (the weight combination spectra illustrates what would simply be a physical combination of raw coal and CCA.

In this particular analyzation, the synthetic fuel spectra is significantly and measurably different from the spectra of the weight combination spectra using the prescribed CCA. The calculated mathematical difference between the weight combination spectra and that of the synfuel spectra totaled a net 30% change. This difference confirms the claim that the synthetic fuel product is the production of chemical change (s) and not merely a physical mixture.

Spectral changes that point to chemical reactions and change include:

1. An increase in absorbance of the doublet peak at around 1050 wave numbers, this area is associated with carbon-oxygen bonds. The increase in the synthetic fuel's absorbance in this area indicates a differing type of bonding than that of a physical mixture. (weight combination).
2. An increase in absorbance at 1600 wave numbers. This area is associated with aromatic carbon—carbon bonds. This indicates that the synthetic product has more aromatic carbon—carbon bonds than a physical mixture would have.
3. An increase in absorbance at 2900 wave numbers. This area is associated with an absorbance associated with carbon-hydrogen bonds. The synthetic fuel product displays a larger number of these bonds than those that would be found in a physical mixture.
4. An increase in aborbance at 1440 wave numbers. This is an area of absorbance associated with carbon-hydrogen bonds as well. The synthetic fuel product displays a larger number of these bonds than those that would be found in a physical mixture.

The Fourier Transform Infrared Spectroscopy analysis of raw coal fines, synthetic fuel product and chemical change proves that several significant chemical changes occurred when raw coal fines were combined with the chemical change agent to create a synthetic fuel product. The synthetic fuel product is another entity entirely when compared with the raw coal fines and the physical combinations of the raw coal fines with the chemical change agent.

Further tests were conducted using the FTIR analysis, thermo-gravimetric analysis, (TGA ?), ASTM proximate analysis, and heating value determination. The TGA analysis indicated that a peak pyrolysis rates of mass loss are significantly different (26.4%) for the fuel product and simple mixtures of the ingredients. This is evidence of significant chemical changes in the fuel product. Good correlation between the levels of ash and sulfur for the feed and product obtained from proximate analysis results, suggests that no significant processing or sampling errors likely occurred with the collection of the samples. Further testing showed that an average difference in measured peak areas (as shown in FIGS. 5 and 6) using FTIR of 16% provides evidence of overall significant change in chemical composition between parent materials and fuel product. The TGA results indicate that peak pyrolysis rates of mass loss are significantly different (36.6%) for the fuel product and the simple mixture of parent ingredients. Further proximate analysis results show that the difference in fixed carbon and volatiles contents between the fuel product and simple ingredients mixture (1.41%) are significantly different.

Having described the preferred embodiments of the invention, it will be obvious to those or ordinary skill in the art that many modifications and chances can be made without departing from the scope of the appended claims.

I claim:

1. A liquid chemical change reagent for use with solid fuels, such as coal or wood, prior to combustion thereof, to reduce NOX and to facilitate complete combustion consisting of: a hydrocarbon wax which includes a fatty acid, water and a base to neutralize the fatty acid, said neutralized fatty acid is a primary emulsifying agent and forms an oil and water emulsion, whereby NOX are reduced and complete combustion is facilitated.

2. The chemical change reagent as in claim 1 wherein said fatty acid is stearic acid.

3. The chemical A change reagent as in claim 1 wherein said hydrocarbon wax is selected from the group consisting of paraffin wax, slack wax, microcrystalline wax, olefinic wax materials and mixtures thereof.

4. The chemical change reagent as in claim 1 wherein said hydrocarbon wax is paraffin wax with paraffin oil.

5. The chemical change reagent as in claim 1 and wherein the base is ammonia or ammonia hydroxide which reacts with the fatty acid.

6. The chemical change reagent as in claim 1 wherein the percentage of fatty acid is 2% by weight.

7. The chemical change reagent as in claim 3 wherein said reagent consists of 46% by weight of said paraffin wax.

8. The chemical change reagent for use with solid fuels, such as coal or wood, prior to combustion thereof, to reduce NOX and to facilitate complete combustion consisting of: a hydrocarbon wax which includes a fatty acid, water and a base to neutralize the fatty acid, said neutralized fatty acid is a primary emulsifying agent and forms an oil and water emulsion, and titanium dioxide, whereby NOX are reduced and complete combustion facilitated.

9. The chemical change reagent as in claim 8 wherein said titanium dioxide is 4.5% by weight.

10. The chemical change reagent for use as a combustible fuel additive to enhance complete combustion and/or reduce NOX and to facilitate complete combustion consisting of the following:

| | |
|---|---|
| Slack wax | 46.3% |
| Other wax | 2.0% |
| Ammonia | 0.2% |
| Titanium Dioxide | 4.5% |
| Water | 47.0% |

11. The chemical change reagent as in claim 10 wherein said other wax is stearic acid.

12. The chemical change reagent as in claim 10 wherein said slack wax is paraffin wax.

13. A method of reducing NOX and facilitating complete combustion of solid fuels such as coal and wood, said method comprising applying a chemical change agent to said solid fuels prior to combustion, said chemical change agent consisting of a hydrocarbon wax, stearic acid and other fatty acids, a base for pH adjustment which reacts with said fatty acid, and water; and burning said solid fuels.

14. The method of claim 13 wherein said base is ammonia.

15. The method of reducing NOX and facilitating complete combustion of solid fuels such as coal and wood, said method comprising applying a chemical change agent to said solid fuels prior to combustion, said chemical change agent consisting of a hydrocarbon wax, stearic acid and other fatty acids, a base for pH adjustment which reacts with said fatty acid, water and titanium dioxide; and burning said solid fuels.

16. The method of claim 15 wherein said base is potassium hydroxide.

17. The method of claim 15 wherein said base is sodium hydroxide.

18. The method of claim 13 wherein said wax is present from 0.5% to 70% by weight.

19. A chemical change reagent for application to coal for enhancing the combustion thereof and/or reducing NOX and facilitating complete combustion consisting of the following composition by weight:

0.5% to 70% of paraffin wax and stearic acid or other fatty acid;

0.2% of a base for pH adjustment, said base reacting with said fatty acid, and

30% to 99% water.

* * * * *